(12) United States Patent
Garikapati et al.

(10) Patent No.: US 12,703,395 B2
(45) **Date of Patent: *Aug. 11, 2026**

(54) IN-VEHICLE ARTIFICIAL INTELLIGENCE ASSISTANT FOR CRITICAL AND UNDETECTED SCENARIO ACCIDENT PREVENTION AND RELATED METHOD

(71) Applicant: Toyota Jidosha Kabushiki Kaisha, Toyota (JP)

(72) Inventors: Divya Garikapati, San Jose, CA (US); Hiroshi Yasuda, San Carlos, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 32 days.

This patent is subject to a terminal disclaimer.

(21) Appl. No.: 18/397,472

(22) Filed: Dec. 27, 2023

(65) Prior Publication Data

US 2025/0214623 A1 Jul. 3, 2025

(51) Int. Cl.
*G08G 1/16* (2006.01)
*B60W 60/00* (2020.01)

(52) U.S. Cl.
CPC ......... *B60W 60/0016* (2020.02); *G08G 1/165* (2013.01); *B60W 2540/21* (2020.02); *B60W 2540/225* (2020.02)

(58) Field of Classification Search
CPC ....... B60W 60/0016; B60W 2540/225; B60W 2540/21; G08G 1/165
See application file for complete search history.

(56) References Cited

U.S. PATENT DOCUMENTS 9,958,870 B1 5/2018 Graybill et al.
11,577,742 B2 2/2023 Lenke et al.
(Continued)

FOREIGN PATENT DOCUMENTS

JP 6872861 B2 5/2021

OTHER PUBLICATIONS

Wang, Brady. "AI Voice Assistants to Push Success of Autonomous Driving, Software-defined Vehicle," retrieved from the Internet: <https://www.counterpointresearch.com/insights/ai-voice-assistants-to-push-success-of-autonomous-driving-software-defined-vehicle/>, retrieved Nov. 8, 2023 (5 pages).
(Continued)

*Primary Examiner* — Jess Whittington
*Assistant Examiner* — Rami Nabih Bedewi
(74) *Attorney, Agent, or Firm* — Christopher G. Darrow; Darrow Mustafa PC

(57) ABSTRACT

Described are systems and methods for minimizing the effects of critical and undetected scenarios using an in-vehicle artificial intelligence system. In one example, the system includes a processor and a memory in communication with the processor. The memory includes instructions that cause the processor to receive an utterance input from an occupant of a vehicle describing a critical scenario that may be undetected by the active safety system of the vehicle. The instructions also cause the processor to determine one or more behavioral measurements of the occupant when the occupant was describing the critical scenario. In response to the utterance input, the behavioral measurement, and the likelihood that the critical scenario can occur at the location of the vehicle, the instructions can cause the vehicle to perform an emergency maneuver to minimize effects of the critical scenario on the vehicle.

15 Claims, 6 Drawing Sheets

(56) References Cited

U.S. PATENT DOCUMENTS

| | | | | |
|---|---|---|---|---|
| 2015/0345968 | A1* | 12/2015 | Wang | G01C 21/3605 701/533 |
| 2017/0217445 | A1 | 8/2017 | Tzirkel-Hancock et al. | |
| 2019/0135274 | A1* | 5/2019 | Chan | A61B 5/6893 |
| 2020/0152197 | A1* | 5/2020 | Penilla | H04L 67/125 |
| 2020/0309548 | A1* | 10/2020 | Shintani | G01C 21/3415 |
| 2021/0086778 | A1* | 3/2021 | Suthar | B60W 40/08 |
| 2021/0132611 | A1 | 5/2021 | Dolgov et al. | |

OTHER PUBLICATIONS

Jude, Alvin, "Self-driving cars need to give passengers a better experience. Here's how," Retrieved from the Internet: <https://www.ericsson.com/en/blog/2020/1/self-drivingcar-passenger-experience>, retrieved Nov. 8, 2023 (pages).

* cited by examiner

IN-VEHICLE ARTIFICIAL INTELLIGENCE ASSISTANT FOR CRITICAL AND UNDETECTED SCENARIO ACCIDENT PREVENTION AND RELATED METHOD

TECHNICAL FIELD

The subject matter described herein relates, in general, to systems and methods for critical and undetected scenario accident prevention.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Some current vehicles have active safety systems and/or autonomous driving systems that can detect objects external to the vehicle and control the vehicle such that the vehicle avoids these external objects. As such, in some cases, these systems can detect the objects, predict their movement, determine the probability of collision with the objects, and cause the vehicle to take appropriate actions to avoid these objects.

SUMMARY

This section generally summarizes the disclosure and is not a comprehensive explanation of its full scope or all its features.

In one embodiment, an in-vehicle artificial intelligence (AI) assistant system includes a processor and a memory in communication with the processor. The memory includes instructions that cause the processor to receive an utterance input from an occupant of a vehicle describing a critical scenario that may be undetected by the active safety system and/or autonomous driving system of the vehicle. The instructions also cause the processor to determine one or more behavioral measurements of the occupant when the occupant was describing the critical scenario. In response to the utterance input, the behavioral measurement, and the likelihood that the critical scenario can occur at the location of the vehicle, the instructions can cause the vehicle to perform an emergency maneuver to minimize effects of the critical scenario on the vehicle.

In another embodiment, a method includes the steps of receiving an utterance input from an occupant of a vehicle describing a critical scenario that may be undetected by the active safety system and/or autonomous driving system of the vehicle and determining one or more behavioral measurements of the occupant when the occupant was describing the critical scenario. In response to the utterance input, the behavioral measurement, and the likelihood that the critical scenario can occur at the location of the vehicle, the method may cause the vehicle to perform an emergency maneuver to minimize effects of the critical scenario on the vehicle.

In yet another embodiment, a non-transitory computer-readable medium includes instructions that, when executed by a processor, cause the processor to receive an utterance input from an occupant of a vehicle describing a critical scenario that may be undetected by the active safety system and/or autonomous driving system of the vehicle and determine one or more behavioral measurements of the occupant when the occupant was describing the critical scenario. Like before, in response to the utterance input, the behavioral measurement, and the likelihood that the critical scenario can occur at the location of the vehicle, the instructions of the non-transitory computer-readable medium may then cause the processor to cause the vehicle to perform an emergency maneuver to minimize effects of the critical scenario on the vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 1A and 1B illustrate different critical scenarios that an in-vehicle AI assistant system can successfully minimize the effects of.

DETAILED DESCRIPTION

Described are in-vehicle AI assistant systems and related methods that can be utilized to take advantage of the observations of one or more occupants of the vehicle and utilize those observations to detect and minimize the effects of critical scenarios on the vehicle and vehicle occupants by performing appropriate evasive maneuvers. Moreover, as explained in the background section, some vehicles are equipped with active safety systems that allow them to detect and predict the movement of objects as well as take appropriate maneuvers to avoid these objects. However, these active safety systems rely on sensor information from environmental sensors that may be mounted to the vehicle. In some cases, the active safety system may not receive appropriate sensor information in time to take corrective actions and/or may not correctly interpret the sensor information. As such, the in-vehicle AI assistant systems and related methods described herein can utilize observations made by the occupants of vehicles to be able to detect critical scenarios and minimize the impact of the scenarios on the vehicle and vehicle occupants.

Figures 1A, 1B:
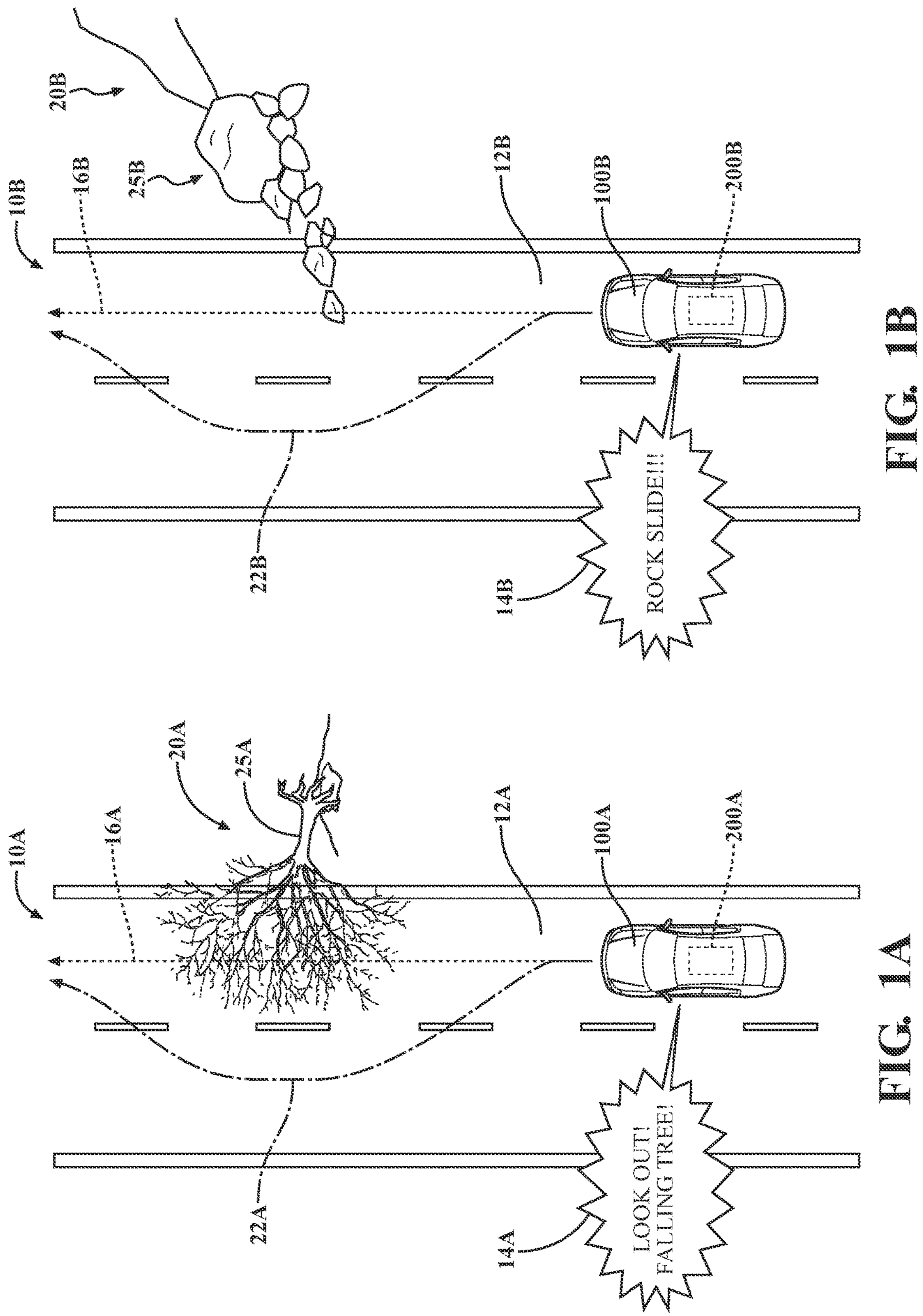

To better understand this concept, reference is made to FIGS. 1A and 1B, which illustrate two different critical scenarios 10A and 10B. Regarding the scenario 10A, in this example, a vehicle 100A includes the in-vehicle AI assistant system 200A, which will be described in greater detail later in this description, and is traveling on a roadway 12A. Under normal circumstances, the vehicle 100A would travel along the roadway 12A, generally along path 16A. However, in the scenario 10A, a critical scenario 20A is occurring. In this example, the critical scenario 20A involves the falling of a tree 25A into the roadway 12A. In this type of scenario, it is possible that the active safety system and/or autonomous vehicle system (if so equipped) of the vehicle 100A may not be able to detect the critical scenario 20A.

As will be explained in greater detail later in this description, the in-vehicle AI assistant system 200A can receive utterance inputs from the occupants of the vehicle 100A and behavioral measurements regarding body movements, such as gestures, eye gaze, facial expressions, etc.) and, after determining a sufficient likelihood that the critical scenario described in the utterance input can actually occur, cause the vehicle to maneuver to minimize the effects of the critical scenario on the vehicle and vehicle occupants.

In this example, assume that the occupants of the vehicle 100A provide the utterance input 14A that describes the falling of the tree 25A. Here, the in-vehicle AI assistant system 200A would determine behavioral measurements of the vehicle occupants and the probability that the critical scenario described in the utterance can actually occur. Depending on the utterance, the behavioral measurements, and the likelihood of the scenario occurring, the in-vehicle AI assistant system 200A can cause the vehicle 100A to maneuver to minimize the critical scenario 20A. In this example, the in-vehicle AI assistant system 200A causes the vehicle 100A to utilize path 22A to avoid the falling tree 25A. Of course, other types of maneuvers can also be performed, such as stopping, speeding up, providing the operator directions to perform the maneuver themselves, etc.

As will be explained later, if the probability indicates that the critical scenario is highly unlikely to actually occur, the in-vehicle AI assistant system 200A may ask the occupants for confirmation or ignore the utterance input if other behavioral measurements and/or prior information do not match with a critical scenario.

The type of critical scenario can vary considerably and should not just be limited to those described in this description. For example, referring to FIG. 1B, the critical scenario 20B includes numerous falling rocks 25B that may be falling onto the roadway 12B, impacting the travel path 16B of the vehicle 100B. In this example, the utterance input 14B provided by the occupant of the vehicle 100B describes the falling rocks 25B. Similar to what was explained before, the in-vehicle AI assistant system 200B would determine behavioral measurements of the vehicle occupants and the probability that the critical scenario described in the utterance can actually occur. Depending on the utterance, the behavioral measurements, and the likelihood of the scenario occurring, the in-vehicle AI assistant system 200B can cause the vehicle 100B to maneuver to minimize the critical scenario 20B. In this example, the in-vehicle AI assistant system 200B causes the vehicle 100B to utilize path 22B to avoid the falling rocks 25B.

Again, it should be understood, that the critical scenario can vary considerably. In some cases, the critical scenario may be down/falling powerlines, landslides, avalanches, bridge failures, other infrastructure failures, and the like.

Figure 2:
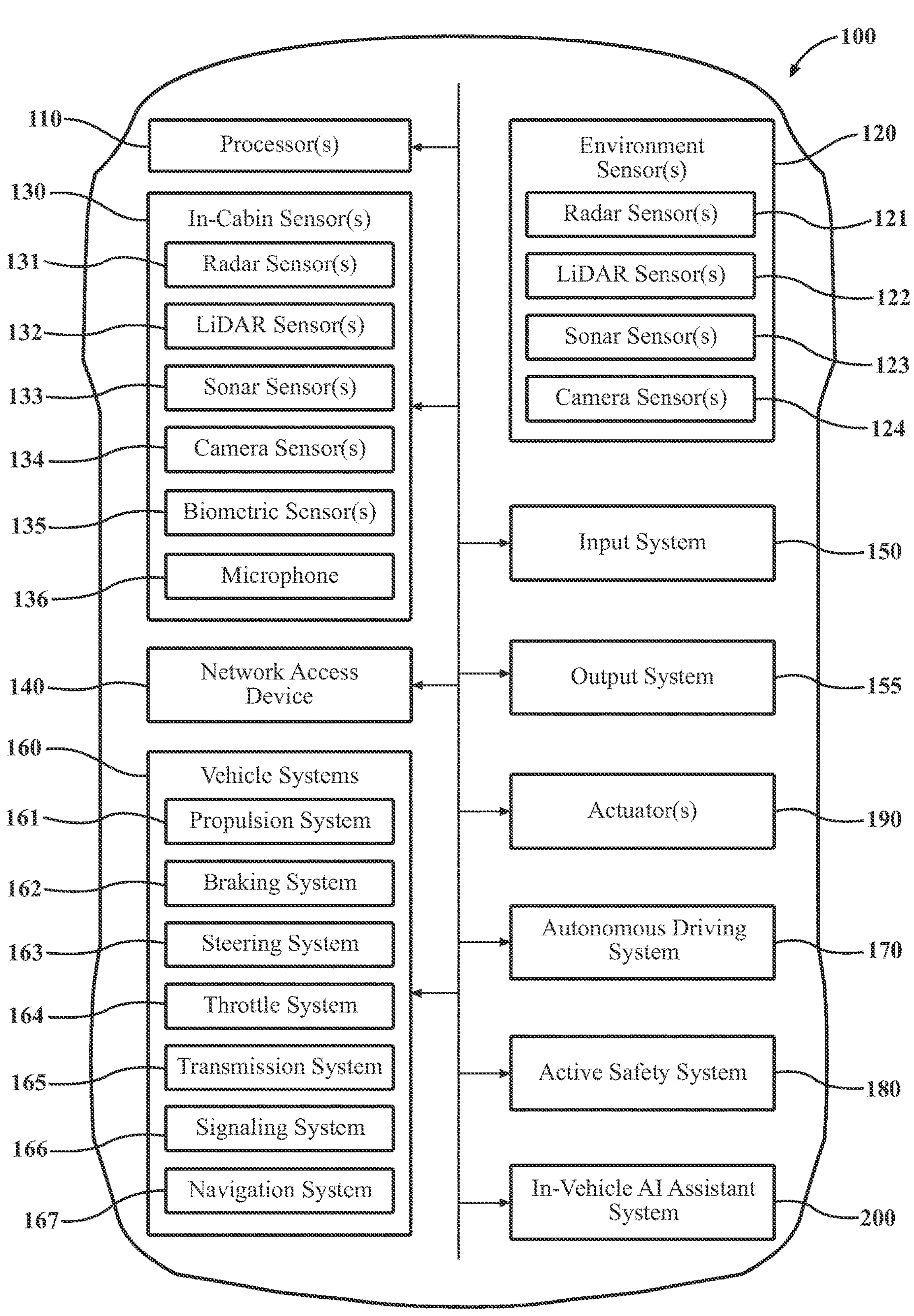
FIG. 2 illustrates one example of a vehicle incorporating the in-vehicle AI assistant system.

Referring to FIG. 2, an example of a vehicle 100, which may be similar to the vehicles 100A and 100B of FIGS. 1A and 1B, respectively, is illustrated that may incorporate an in-vehicle AI assistant system 200. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 170. In some cases, instead of or in complement to the autonomous driving system 170, the vehicle 100 may have an active safety system 180 that may be able to perform emergency maneuvers described herein.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 2 and will be described along with subsequent figures. However, a description of many of the elements in FIG. 2 will be provided after the discussion of FIGS. 3-6 for the purpose of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

Figure 3:
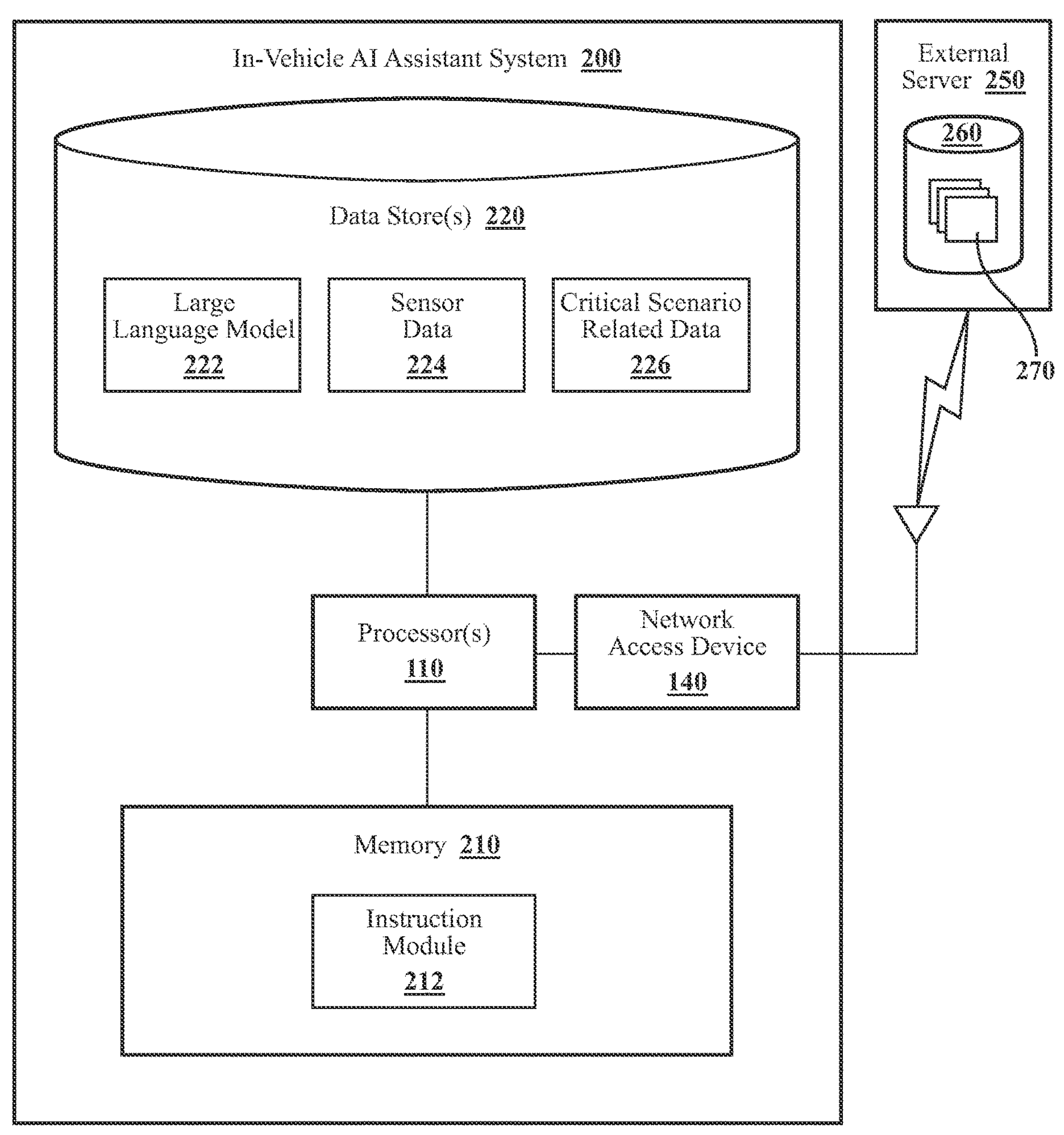
FIG. 3 illustrates a more detailed view of the in-vehicle AI assistant system.

In either case, the vehicle 100 includes the in-vehicle AI assistant system 200. The in-vehicle AI assistant system 200 may be incorporated within the autonomous driving system 170 (if the vehicle 100 is so equipped) and/or the active safety system 180. With reference to FIG. 3, one embodiment of the in-vehicle AI assistant system 200 is further illustrated. As shown, the in-vehicle AI assistant system 200 includes a processor(s) 110. Accordingly, the processor(s) 110 may be a part of the in-vehicle AI assistant system 200 or the in-vehicle AI assistant system 200 may access the processor(s) 110 through a data bus or another communication path. In one or more embodiments, the processor(s) 110 is an application-specific integrated circuit that is configured to implement functions associated with an instruction module 212 that includes instructions for executing any of the methods described in this disclosure. In general, the processor(s) 110 is an electronic processor, such as a microprocessor, central processing unit (CPU), graphical processing unit (GPU), field programmable gate array (FPGA), and the like, which is capable of performing various functions as described herein.

In one embodiment, the in-vehicle AI assistant system 200 includes a memory 210 that stores the instruction module 212. The memory 210 may be a random-access memory (RAM), read-only memory (ROM), a hard disk drive, a flash memory, or other suitable memory for storing the instruction module 212. As mentioned before, the instruction module 212 is, for example, computer-readable instructions that, when executed by the processor(s) 110, cause the processor(s) 110 to perform the various functions disclosed herein.

Furthermore, in one embodiment, the in-vehicle AI assistant system 200 includes a data store(s) 220. The data store(s) 220 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 220 stores data used by instructions stored in the instruction module 212 in executing various functions.

In this example, the data store(s) 220 includes a large language model 222, sensor data 224, and critical scenario-related data 226. As to the large language model 222, the large language model 222 allows the in-vehicle AI assistant system 200 to achieve general-purpose language understanding and generation with one or more occupants of the vehicle 100. For example, the large language model 222 may have been able to acquire these abilities by using massive amounts of data to learn numerous parameters during training. In one example, the in-vehicle AI assistant system 200 can speak or communicate with the vehicle occupant using natural language. Furthermore, there may be an option to select different languages, dialects, etc., if needed.

The sensor data 224 can be any sensor data collected by one or more systems and subsystems of the vehicle 100. For example, the sensor data 224 can include data collected within the cabin, such as data related to one or more occupants of the vehicle 100 using the in-cabin sensors 130 shown in FIG. 2. Additionally, the sensor data 224 can also include sensor data regarding the environment in which the vehicle 100 operates within and may be collected by one or more environment sensor(s) 120, also shown in FIG. 2. Details regarding how the sensor data 224 is utilized by the in-vehicle AI assistant system 200 will be provided later in this description.

As to critical scenario-related data 226, the critical scenario-related data relates to the actual occurrence and/or probable occurrence of a critical scenario at one or more locations, such as locations the vehicle 100 is operating. In order to keep the critical scenario-related data 226 up to date, the processor(s) 110 may utilize a network access device 140 that allows the in-vehicle AI assistant system 200 to communicate with external devices, such as an external server 250. The external server 250 may include database 260, which includes data 270 that describes the actual or probable occurrences of critical scenarios at particular locations. As mentioned before, the type of critical scenario information stored within the critical scenario-related data 226 can include any type of critical scenario, such as falling trees, rockslides, down/falling powerlines, landslides, avalanches, bridge failures, other infrastructure failures, and the like.

The probability that a particular critical scenario may occur at a particular location can be based on historical information, geographical/geological information, vegetative information, information regarding the flora/fauna, and the like. For example, if a particular location is in a rocky desert devoid of any trees, the probability of a tree falling in that location would be close to zero. However, the probability of a rockslide may be much higher. In another example, if there are no powerlines in a particular location, the probability of down/falling powerlines should also be close to zero. However, if the same particular location has numerous trees, the chance of the falling tree may be much higher.

Turning attention to the instruction module 212, as mentioned before, the instruction module 212 includes instructions that, when executed by the processor(s) 110, cause the processor(s) 110 to perform any of the functions described herein. In one example, the instructions of the instruction module 212 cause the processor(s) 110 to obtain critical scenario information that may be stored within the critical scenario-related data 226. As mentioned before, this will be achieved by having the processor(s) 110 request updated data 270 from an external server 250 via a network access device 140. This essentially allows the in-vehicle AI assistant system 200 to have updated critical scenario-related information regarding any actual critical scenario occurring or any probability of any critical scenarios occurring near the location of the vehicle 100. The location of the vehicle may be determined by a navigation system 167 (shown in FIG. 2) that may utilize one or more global navigation satellite systems, such as Global Positioning System (GPS), Global Navigation Satellite System (GLONASS), BeiDou Navigation Satellite System, and Galileo to determine the location of the vehicle 100.

Additionally, maps, such as high-definition maps onboard the vehicle 100, can also be utilized to localize the vehicle 100 accurately. Along with map information, information related to trees, rocky terrains, power lines etc., calamity-related information can be provided beforehand along with V2X capability to access more live data. The in-vehicle AI assistant system 200 can also leverage the data from other vehicles, cloud infrastructure, etc., to save certain information that can be referenced later in scenarios where the data streaming ability is limited due to V2X or network limitations. Offline databases may be made available to the vehicle 100 or in-vehicle AI assistant system 200, along with high-definition maps in case of failures with V2X or network. As this is a safety system, having these backup or redundant mechanisms is important.

The instruction module 212 also allows the processor(s) 110 of the in-vehicle AI assistant system 200 to monitor for any type of utterance input provided by the occupant via a sensor, such as a microphone 136. Essentially, the processor(s) 110 examines audio data provided by the microphone 136 for utterances that describe a critical scenario or provide emergency instructions. Examples of utterances by the operator acting as the utterance input can be numerous. In one limited set of examples, the utterances by the operator acting as the utterance input can include utterances such as "look out for that tree," "rockslide, be careful," "watch out for the downed power line," etc. Generally, the utterance input will describe the type of critical scenario, such as a falling tree, rockslide, downed power line, avalanche, etc.

Upon determining that the utterance input describes a critical scenario, the instruction module 212 causes the processor(s) 110 to determine one or more behavioral measurements of the body language of the occupants of the vehicle, such as the occupant that actually provided the utterance input. The behavioral measurements may be determined by receiving input information from in-cabin sensors 130 of the vehicle 100. The in-cabin sensors 130 can include a number of different sensors, including radar sensor(s) 131, LIDAR sensor(s) 132, sonar sensor(s) 133, camera sensor(s) 134, biometric sensor(s) 135, microphone(s) 136, etc. In particular, images captured by the camera sensor(s) 134 of the occupant may provide information regarding the body language and/or facial expressions of the occupant that can be utilized to determine one or more behavioral measurements of the occupant that made the utterance.

Figure 4A:
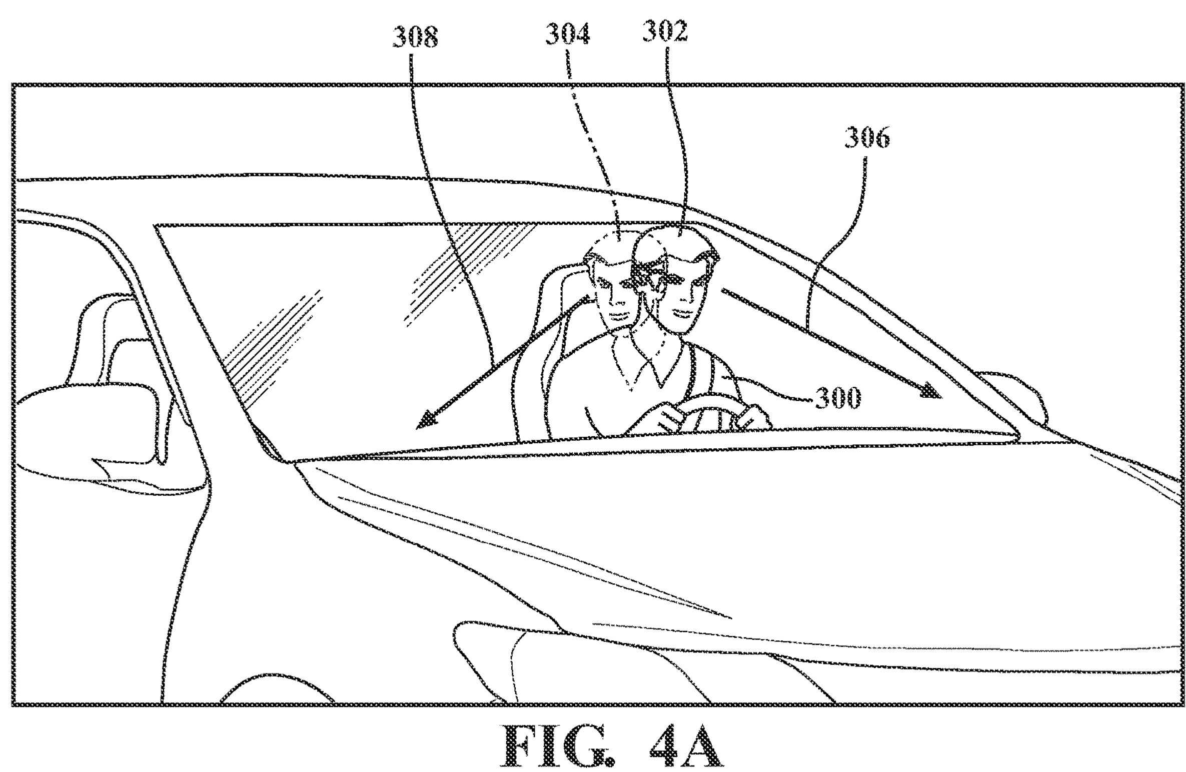
FIGS. 4A and 4B illustrate different types of body movements that the in-vehicle AI assistant system may interpret.

The behavioral measurements can include measurements regarding facial expressions that can be used to determine mood, eye gaze, pupil dilation, biometric information (pulse, blood pressure, body temperature, perspiration, etc.), and gestures. For example, FIG. 4A illustrates an example of an occupant 300. The in-cabin sensors 130 can be used to determine where the occupant that may have provided the utterance is looking, such as by monitoring different head positions 302 and 304 of the occupant 300 as well as different gazes 306 and 308 of the occupant 300. In this particular example, determining head position and/or gaze may be useful in determining where the occupant 300 that provided the utterance input, is looking. Knowing where the occupant 300 is looking can be useful in determining the location of the critical scenario that the occupant 300 is describing.

It should be noted that while the occupant 300 is shown to be in the front driver seat, it should be understood that the occupant 300 can be located in any of the seats and does not necessarily need to be located in the front of the vehicle or behind the steering wheel of the vehicle.

Figure 4B:
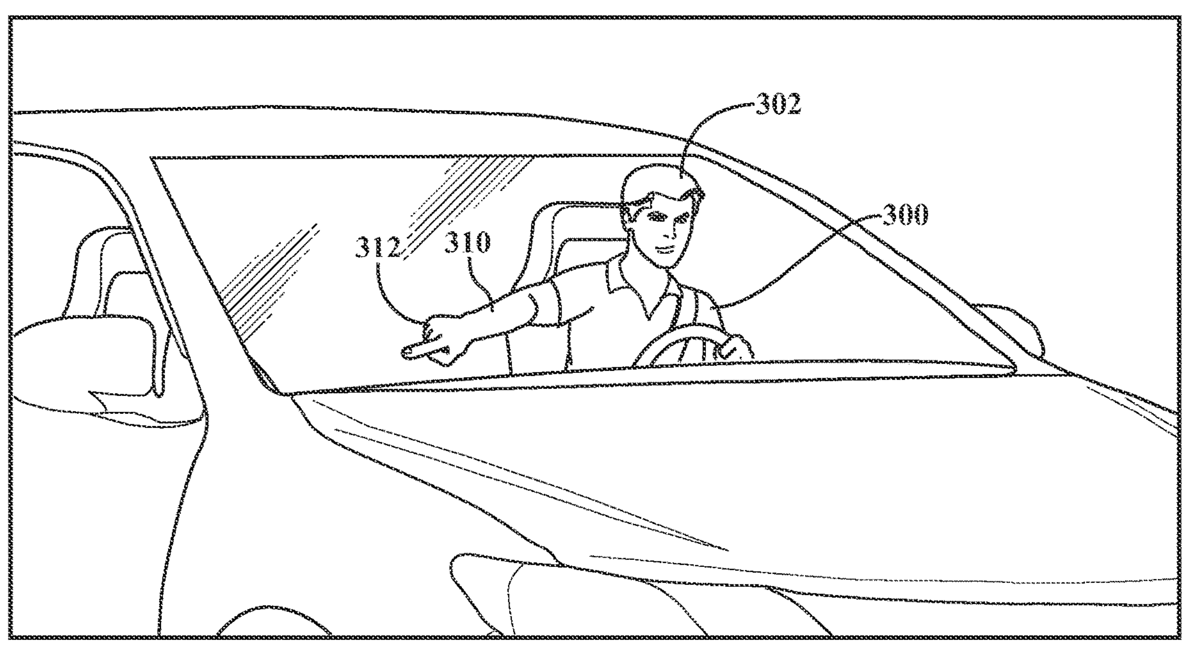
Figures 5A, 5B, 5C:
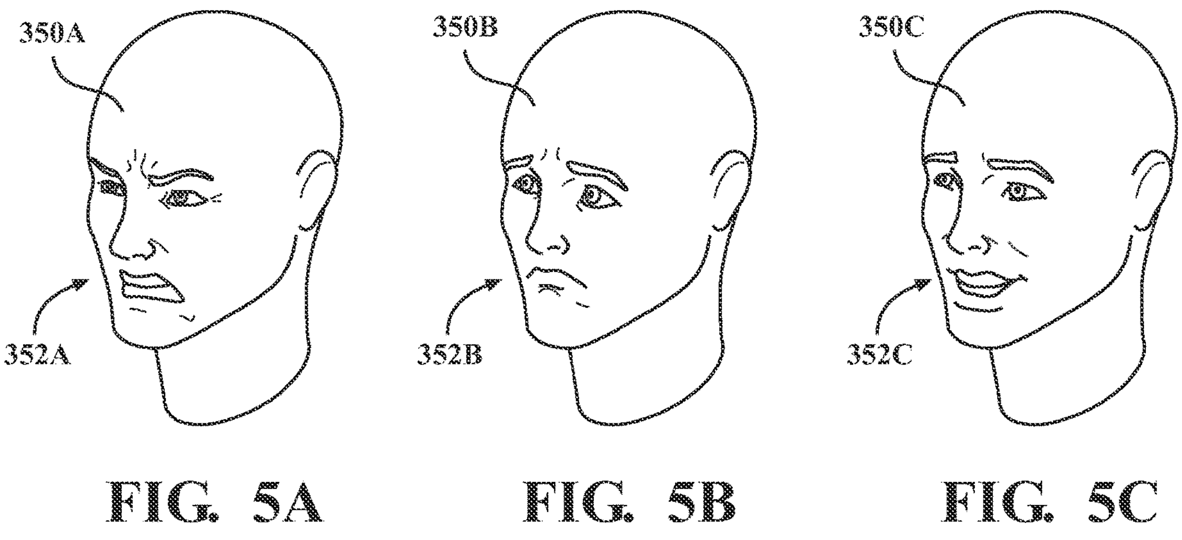
FIGS. 5A-5F illustrate different types of facial expressions that the in-vehicle AI assistant system can utilize to determine the mood of the occupant of the vehicle.
Figures 5D, 5E, 5F:
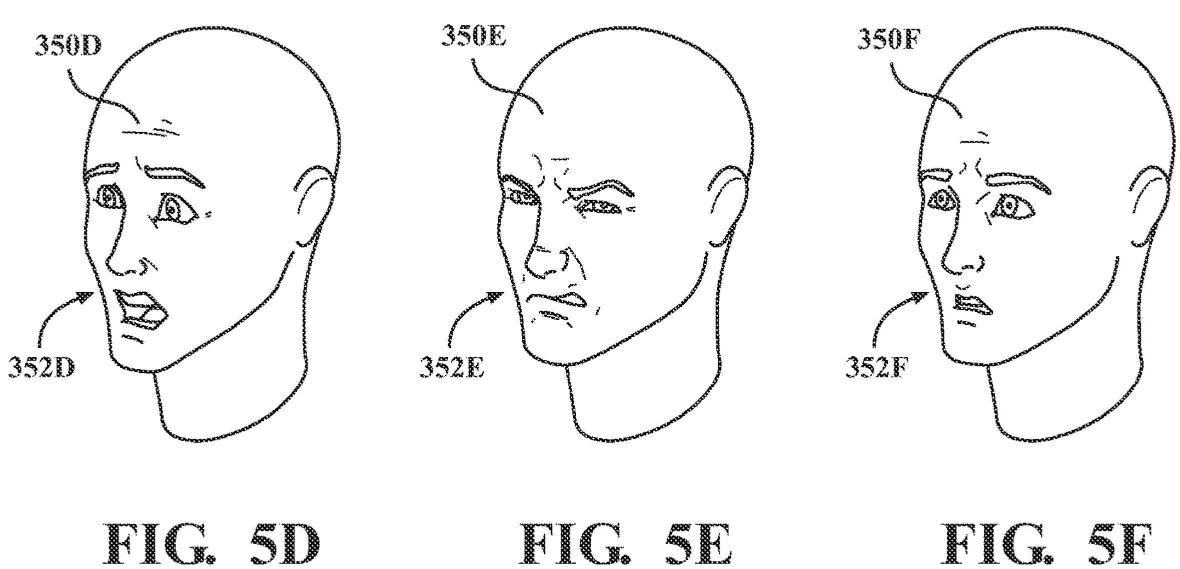

As previously mentioned, the behavioral measurements can also include gestures. For example, FIG. 4B illustrates the occupant 300 having a head position 302 that is generally looking forward of the vehicle but has extended their arm 310 such that it indicates a pointing gesture 312. Similar to gaze and head position, the pointing gesture 312 can be utilized to determine the location of the critical scenario that the occupant 300 is describing.

Again, it should be understood that behavioral measurements may also include the overall mood of the occupant who performs the utterance. Mood can be determined by analyzing one or more images of the facial expressions of the occupant. For example, FIGS. 5A-5F illustrate faces 350A-350F of different types of facial expressions 352A-352F of the occupant that generally align with the mood of the occupant. In particular, by monitoring the mouth shape, forehead, eyes, and other facial features of the occupant, one or more moods can be derived. For example, the facial expression 352A generally relates to anger, the facial expression 352B relates to sadness, the facial expression 352C relates to happiness and/or sociability, the facial expression 352D relates to fear, the facial expression 352E relates to disgust, and the facial expression 352F relates to surprise.

It should also be understood that while the moods described above are based on facial expressions, it is also possible that the mood of the occupant can be determined utilizing other information, such as biometric information that may be collected from biometric sensor(s) 135 and/or body language information that can be captured from for many of the in-cabin sensors 130. For example, the body language of the occupant may be utilized to either augment and/or confirm moods determined by facial expressions. Further still, the body language of the occupant may be used solely to determine the mood of the occupant, instead of relying on facial expressions.

The instruction module 212 includes instructions that, when executed by the processor(s) 110, cause the processor(s) 110 to consider the probability of the critical scenario occurring in the vehicle location, the behavioral measurements (eye gaze, facial expressions, hand gestures, etc.), and the utterance describing the critical scenario and then mapping these inputs to an appropriate next action, such as an emergency maneuver.

For example, if (1) the critical scenario is described as a falling tree, (2) the probability of the critical scenario occurring is rather high, (3) the facial expressions indicate fear, and (4) the gaze and/or gestures indicate that the critical scenario is happening to the left of the occupant, the instruction module 212 may cause the processor(s) 110 to control the vehicle 100 so as to minimize the impact of the critical scenario on the vehicle 100 and/or the occupants of the vehicle 100. In one example, the vehicle 100 may speed up so as to pass the tree that is falling before it actually falls. In other cases, if there is less fear being expressed by the occupant and the occupant is pointing to something farther away, the instruction module 212 may cause the processor(s) 110 to control the vehicle 100 to avoid the area where the tree may fall.

The mapping to a particular action/maneuver can vary from situation to situation and should not be limited to the examples given in this description. For example, if the probability of the critical scenario that was uttered by the occupant occurring is rather low and the facial expressions of the occupant indicate that the occupant is happy and/or sociable, the instruction module 212 may cause the processor(s) 110 to audibly interact with the occupant and asked the occupant to confirm or describe further whether the critical scenario is actually happening. Again, the mapping to a particular action/maneuver can vary considerably based on the type of critical scenario occurring, the behavioral measurements of the occupant, the probability that the critical scenario can actually occur, etc. The chart below illustrates one example of mapping the probability, behavioral measurements (eye gaze, facial expressions, hand gestures), and the utterance word that describes the critical scenario of a particular emergency maneuver or action.

| Probability of Occurrence | Eye Gaze | Facial Expressions | Hand Gestures | Utterance Word | Emergency Maneuver/Action |
|---|---|---|---|---|---|
| High | Left side | Fear | Pointing near left | Stop, Tree | Speed up or perform emergency maneuvers, such as breaking (longitudinal |

-continued

| Probability of Occurrence | Eye Gaze | Facial Expressions | Hand Gestures | Utterance Word | Emergency Maneuver/Action |
|---|---|---|---|---|---|
| | | | | | control) or steering (lateral control), or a combination thereof. |
| Medium | Left side | Slight fear | Pointing something far away | Tree | Make a lane change as far as possible from the current lane and change directions to take an exit or turn. |
| Low | Left side | Minor surprise | Pointing to something that does not look like a tree | Tree | Stay in lane and ask for more confirmation to activate other maneuvers |

By considering the utterance input provided by the occupant, the in-vehicle AI assistant system 200 can essentially augment the detections made by the environment sensor(s) 120 of the vehicle 100. In particular, there may be situations that the environment sensor(s) 120 do not detect a particular situation or objects, and/or the autonomous driving system 170 and/or the active safety system 180 may not correctly interpret signals from the environment sensor(s) 120 of the vehicle 100 and therefore do not properly detect a critical scenario. As such, augmenting these systems with utterances from the occupant can improve the overall safety of the vehicle 100 and the occupants located within.

Additionally, by considering the behavioral measurements and the probability that a particular critical scenario can actually occur in the location of the vehicle, the in-vehicle AI assistant system 200 can also filter out potential false positives/negatives but also take appropriate emergency maneuvers or other actions that also improve the overall safety of the vehicle 100 and the occupants located within.

It should also be noted that the in-vehicle AI assistant system 200, the autonomous driving system 170, and/or the active safety system 180 can be trained using the utterances provided by the occupant, so these systems are better at detecting these types of scenarios. Further still, the systems could also be partially trained regarding these critical scenarios via rooftop sensors detecting objects in the upward direction and/or with a very high range.

Figure 6:
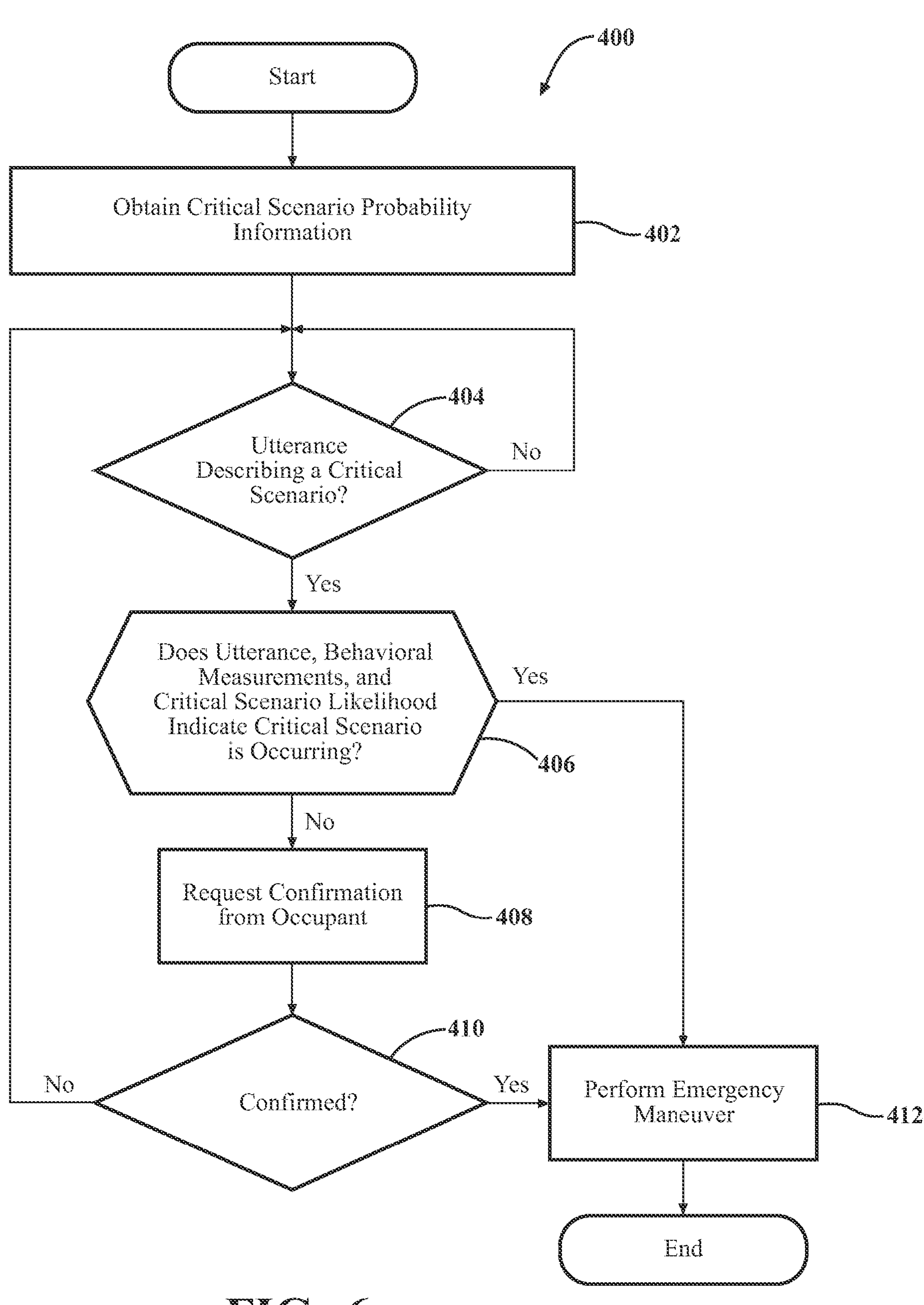
FIG. 6 illustrates a method that the in-vehicle AI assistant system may utilize to minimize the effects of critical and undetected scenarios.

Referring to FIG. 6, a method 400 for appropriately handling critical and undetected scenarios is shown. The method 400 will be described from the viewpoint of the vehicle 100 of FIG. 2 and the in-vehicle AI assistant system 200 of FIG. 3. However, it should be understood that this is just one example of implementing the method 400. While method 400 is discussed in combination with the in-vehicle AI assistant system 200, it should be appreciated that the method 400 is not limited to being implemented within the in-vehicle AI assistant system 200, but is instead one example of a system that may implement the method 400. It should be noted that some of the steps of the method 400 may have previously been described when describing the functionality provided by the instructions of the instruction module 212. As such, any methodologies or features described above should be understood to also be possibly incorporated within the method 400.

In step 402, the instruction module 212 may cause the processor(s) 110 to obtain critical scenario information that may be stored within the critical scenario-related data 226. As mentioned before, this will be achieved by having the processor(s) 110 request updated data 270 from an external server 250 via a network access device 140. This essentially allows the in-vehicle AI assistant system 200 to have updated critical scenario-related information regarding any actual critical scenario occurring or any probability of any critical scenarios occurring near the location of the vehicle 100.

In step 404, the instruction module 212 may cause the processor(s) 110 to continuously monitor for utterances provided by one or more occupants of the vehicle 100 that describe a critical scenario.

If an utterance input is received, in step 406, the instruction module 212 may cause the processor(s) 110 to consider the critical scenario described by the utterance, the behavioral measurements, and the likelihood that the critical scenario can actually occur in the location of the vehicle 100. In some cases, determining the likelihood that the critical scenario can actually occur may be accomplished by processing or reviewing the critical scenario-related data 226 that may either contain likelihoods that a particular critical scenario at a particular location can occur and/or base information that can be utilized by the processor(s) 110 to determine the likelihood that a particular scenario can occur at the location of the vehicle 100. A critical scenario may be determined to likely occur by comparing the likelihood to one or more thresholds.

Based on the utterance, behavioral measurements, and the likelihood that the critical scenario can occur, the instruction module 212 may cause the processor(s) 110 to take an appropriate action. In some cases, if the probability indicates that the particular critical scenario is unlikely to occur at the location of the vehicle 100, the instruction module 212 may cause the processor(s) 110 to request confirmation from the occupant, as shown in step 408. If confirmation is confirmed, as shown in step 410, the method will proceed to step 412. In some cases, a determination of whether to ask for confirmation may be based on comparing the probability that the critical scenario can actually occur to some type of threshold. For example, if the probability is less than 10%, the instruction module 212 may cause the processor(s) 110 to require confirmation. However, if the probability is greater than some threshold, such as greater than 10%, the system may then perform an appropriate maneuver. Of course, it should be understood that the thresholds can vary from application to application.

Confirmation from the occupant can be achieved by having the large language model 222 interact with the occupant using one or more vehicle systems, such as the input system 150, the output system 155, or any of the in-cabin sensors 130, such as the microphone 136. Essentially, the occupant can provide audible confirmation and even provide additional descriptions regarding critical scenarios.

In step 412, assuming that the critical scenario is actually happening, the instruction module 212 may cause the processor(s) 110 to then take an appropriate course of action, such as controlling the vehicle 100 to perform an emergency maneuver to minimize the effects of the critical scenario on the vehicle 100 and the occupants of the vehicle 100. For example, this can include speeding/slowing the velocity of the vehicle 100, steering the vehicle 100 to avoid the critical scenario, and/or bringing the vehicle 100 to a complete stop altogether. Of course, these are just examples of maneuvers, and other types of maneuvers may also be considered and performed as well.

FIG. 2 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As mentioned, the vehicle 100 can include one or more processor(s) 110. In one or more arrangements, the processor(s) 110 can be a main processor of the vehicle 100. For instance, the processor(s) 110 can be an electronic control unit (ECU), As noted above, the vehicle 100 can include environment sensor(s) 120 for sensing the environment surrounding the vehicle 100 and in-cabin sensors for monitoring the occupants and the interior of the vehicle 100. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

The environment sensor(s) 120 can include any suitable type of sensor configured to acquire, and/or sense driving environment data. "Driving environment data" includes data or information about the external environment in which an autonomous vehicle is located or one or more portions thereof. For example, the one or more environment sensor(s) 120 can be configured to detect, quantify and/or sense obstacles in at least a portion of the external environment of the vehicle 100 and/or information/data about such obstacles. Such obstacles may be stationary objects and/or dynamic objects. The one or more environment sensor(s) 120 can be configured to detect, measure, quantify, and/or sense other things in the external environment of the vehicle 100, for example, lane markers, signs, traffic lights, traffic signs, lane lines, crosswalks, curbs proximate the vehicle 100, off-road objects, etc.

Various examples of sensors of the environment sensor(s) 120 will be described herein. It will be understood that the embodiments are not limited to the particular sensors described. As an example, in one or more arrangements, the environment sensor(s) 120 can include one or more radar sensors 121, one or more LIDAR sensors 122, one or more sonar sensors 123, and/or one or more cameras 124.

Similarly, the in-cabin sensors 130 can also include one or more radar sensor(s) 131, one or more LIDAR sensor(s) 132, one or more sonar sensor(s) 133, and/or one or more camera sensor(s) 134. In addition, the in-cabin sensors 130 can also include biometric sensor(s) 135 for measuring one or more physiological conditions of the occupants of the vehicle 100 and a microphone 136 for monitoring utterances by the occupants of the vehicle 100. In particular, the in-cabin sensors 130 can be utilized to determine the mood of the occupants by analyzing facial expressions, body language, and/or biometric information of the occupants.

The vehicle 100 can include an input system 150. An "input system" includes any device, component, system, element, arrangement, or groups thereof that enable information/data to be entered into a machine. The input system 150 can receive an input from a vehicle passenger (e.g., a driver or a passenger). The vehicle 100 can include an output system 155. An "output system" includes any device, component, arrangement or groups thereof that enable information/data to be presented to a vehicle passenger (e.g., a person, a vehicle passenger, etc.).

The vehicle 100 can include one or more vehicle systems 160. Various examples of the one or more vehicle systems 160 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 161, a braking system 162, a steering system 163, a throttle system 164, a transmission system 165, a signaling system 166, and/or a navigation system 167. Each of these systems can include one or more devices, components, and/or a combination thereof, now known or later developed.

The navigation system 167 can include one or more devices, applications, and/or combinations thereof, now known or later developed, configured to determine the geographic location of the vehicle 100 and/or to determine a travel route for the vehicle 100. The navigation system 167 can include one or more mapping applications to determine a travel route for the vehicle 100. The navigation system 167 can include a global positioning system, a local positioning system, or a geolocation system.

The autonomous driving system 170 can be operatively connected to communicate with the vehicle systems 160 and/or individual components thereof. For example, the processor(s) 110 and/or the autonomous driving system 170 can be in communication to send and/or receive information from the vehicle system 160 to control the movement, speed, maneuvering, heading, direction, etc., of the vehicle 100. The processor(s) 110 and/or the autonomous driving system 170 may control some or all of these vehicle systems 160 and, thus, may be partially or fully autonomous.

The processor(s) 110 and/or the autonomous driving system 170 can be operatively connected to communicate with the vehicle systems 160 and/or individual components thereof. For example, returning to FIG. 2, the processor(s) 110 and/or the autonomous driving system 170 can be in communication to send and/or receive information from the vehicle systems 160 to control the movement, speed, maneuvering, heading, direction, etc. of the vehicle 100. The processor(s) 110 and/or the autonomous driving system 170 may control some or all of these vehicle systems 160.

The processor(s) 110 and/or the autonomous driving system 170 may be operable to control the navigation and/or maneuvering of the vehicle 100 by controlling one or more of the vehicle systems 160 and/or components thereof. For instance, when operating in an autonomous mode, the processor(s) 110 and/or the autonomous driving system 170 can control the direction and/or speed of the vehicle 100. The processor(s) 110 and/or the autonomous driving system 170 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, “cause” or “causing” means to make, force, direct, command, instruct, and/or enable an event or action to occur or at least be in a state where such event or action may occur, either directly or indirectly.

The vehicle 100 can include one or more actuators 190. The actuators 190 can be any element or combination of elements operable to modify, adjust, and/or alter one or more of the vehicle systems 160 or components thereof to be responsive to receiving signals or other inputs from the processor(s) 110 and/or the autonomous driving system 170. Any suitable actuator can be used. For instance, the one or more actuators 190 can include motors, pneumatic actuators, hydraulic pistons, relays, solenoids, and/or piezoelectric actuators, to name a few possibilities.

The vehicle 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase “computer-readable storage medium” means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. Other suitable components could include additional central processing units (CPUs) and/or graphics processing units (GPUs). In particular, GPUs may be required for AI Assistant development, implementation, training, and testing.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). For example, vehicle-to-everything (V2X) can be used to communicate to other devices to share computational, storage communication, etc., resources. Vehicular ad hoc networks (VANETs) can also be utilized, which are created by applying the principles of mobile ad hoc networks—the spontaneous creation of a wireless network of mobile devices—to the domain of vehicles.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor; and a memory in communication with the processor, the memory having instructions that, when executed by the processor, cause the processor to:

receive an utterance input from an occupant of a vehicle describing a critical scenario;

responsive to determining that a likelihood of the critical scenario occurring in a location of the vehicle meets a threshold, cause the vehicle to perform an emergency maneuver to minimize effects of the critical scenario on the vehicle when a mood of the occupant is at least one of anger, sadness, fear, disgust, and surprise; and responsive to determining that the likelihood of the critical scenario occurring in the location of the vehicle does not meet the threshold, cause the vehicle to (b)-perform the emergency maneuver after receiving additional information from the occupant that the critical scenario is occurring when the mood of the occupant is at least one of being happy and being sociable.

2. The system of claim 1, wherein the additional information includes at least one of confirmation that the critical scenario is occurring and a location of the critical scenario.

3. The system of claim 1, wherein the mood of the occupant is based on one or more of: a gaze of the occupant, gestures of the occupant, and facial expressions of the occupant.

4. The system of claim 1, wherein the memory further includes instructions that, when executed by the processor, cause the processor to activate vehicle sensors to detect the critical scenario in response to the utterance input.

5. The system of claim 1, wherein the emergency maneuver is determined based on a behavioral measurement of the occupant.

6. The system of claim 1, wherein the memory further includes instructions that, when executed by the processor, cause the processor to leverage external data from external devices and save information that can be referenced later in scenarios where a data streaming ability is limited due to network limitations, the information comprises locations related to elements in the scenarios along with map information.

7. A method comprising steps of:

receiving an utterance input from an occupant of a vehicle describing a critical scenario;

responsive to determining that a likelihood of the critical scenario occurring in a location of the vehicle meets a threshold, causing the vehicle to perform an emergency maneuver to minimize effects of the critical scenario on the vehicle when a mood of the occupant is at least one of anger, sadness, fear, disgust, and surprise; and responsive to determining that the likelihood of the critical scenario occurring in the location of the vehicle does not meet the threshold, causing the vehicle to perform the emergency maneuver after receiving additional information from the occupant that the critical scenario is occurring when the mood of the occupant is at least one of being happy and being sociable.

8. The method of claim 7, wherein the additional information includes at least one of confirmation that the critical scenario is occurring and a location of the critical scenario.

9. The method of claim 7, wherein the mood of the occupant is based on one or more of: a gaze of the occupant, gestures of the occupant, and facial expressions of the occupant.

10. The method of claim 7, further comprising activating vehicle sensors to detect the critical scenario in response to the utterance input.

11. The method of claim 7, wherein the emergency maneuver is determined based on a behavioral measurement of the occupant.

12. The method of claim 7, further comprising leveraging external data from external devices and saving information that can be referenced later in scenarios where a data streaming ability is limited due to network limitations, the information comprises locations related to elements in the scenarios along with map information.

13. A non-transitory computer-readable medium having instructions that, when executed by a processor, cause the processor to:

receive an utterance input from an occupant of a vehicle describing a critical scenario;

responsive to determining that a likelihood of the critical scenario occurring in a location of the vehicle meets a threshold, cause the vehicle to perform an emergency maneuver to minimize effects of the critical scenario on the vehicle when a mood of the occupant is at least one of anger, sadness, fear, disgust, and surprise; and responsive to determining that the likelihood of the critical scenario occurring in the location of the vehicle does not meet the threshold, cause the vehicle to perform the emergency maneuver after receiving additional information from the occupant that the critical scenario is occurring when the mood of the occupant is at least one of being happy and being sociable.

14. The non-transitory computer-readable medium of claim 13, wherein the additional information includes at least one of confirmation that the critical scenario is occurring and a location of the critical scenario.

15. The non-transitory computer-readable medium of claim 13, wherein the mood of the occupant is based on one or more of: a gaze of the occupant, gestures of the occupant, and facial expressions of the occupant.

* * * * *